United States Patent
Kuschewski et al.

(10) Patent No.: US 11,445,870 B2
(45) Date of Patent: Sep. 20, 2022

(54) BLOWER APPARATUS

(71) Applicant: Andreas Stihl AG & Co. KG, Waiblingen (DE)

(72) Inventors: Mario Kuschewski, Weil der Stadt (DE); Simon Jug, Lorch (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 375 days.

(21) Appl. No.: 16/436,594

(22) Filed: Jun. 10, 2019

(65) Prior Publication Data
US 2019/0374078 A1 Dec. 12, 2019

(30) Foreign Application Priority Data
Jun. 12, 2018 (DE) .......................... 102018004680.0

(51) Int. Cl.
A47L 5/14 (2006.01)

(52) U.S. Cl.
CPC ...................... A47L 5/14 (2013.01)

(58) Field of Classification Search
CPC .......... A01G 20/47; A47L 5/14; A47L 9/322; E01H 1/0863
See application file for complete search history.

(56) References Cited

U.S. PATENT DOCUMENTS

| | | | | |
|---|---|---|---|---|
| 5,535,479 A * | 7/1996 | Pink | .......................... | A47L 9/32 15/410 |
| 5,926,910 A | 7/1999 | Nishimura et al. | | |
| 8,943,645 B2 * | 2/2015 | Osterchill | .............. | A01G 20/47 15/330 |
| 9,138,113 B2 * | 9/2015 | Nesom | .................... | A01G 20/47 |
| 10,107,292 B2 | 10/2018 | Schaeffler et al. | | |
| 2008/0022481 A1 * | 1/2008 | Reeves | ................. | E01H 1/0836 15/330 |
| 2009/0241285 A1 * | 10/2009 | Hinklin | ...................... | A47L 5/14 15/330 |
| 2012/0131762 A1 * | 5/2012 | Minor | .................... | A01G 20/47 15/344 |
| 2012/0138717 A1 * | 6/2012 | Svoboda | ................. | A01G 20/47 241/56 |
| 2013/0185892 A1 * | 7/2013 | Walker | ...................... | A47L 5/24 15/330 |

(Continued)

FOREIGN PATENT DOCUMENTS

| | | |
|---|---|---|
| CN | 104154008 A | 11/2014 |
| CN | 205676815 U | 11/2016 |
| DE | 29620006 U1 | 3/1998 |

(Continued)

Primary Examiner — Marc Carlson
(74) Attorney, Agent, or Firm — Walter Ottesen, P.A.

(57) ABSTRACT

A blower apparatus is driven by a drive motor and has an intake opening and a discharge opening. The blower apparatus has a handle for guiding the blower apparatus with the handle being mounted on the blower apparatus such that it is pivotable from a first position into at least a second position. The blower apparatus is configured such that, during operation of the blower apparatus, an air flow passes through the discharge opening in a discharge direction. The handle has a grip region, which, in the first position, is inclined differently with respect to the discharge direction compared with the second position.

15 Claims, 10 Drawing Sheets

(56) References Cited

U.S. PATENT DOCUMENTS

2014/0331444 A1* 11/2014 Nesom .................. A01G 20/47
                                                    15/330
2016/0157686 A1*  6/2016 Bermudez ............. A01G 20/47
                                                    15/330

FOREIGN PATENT DOCUMENTS

| DE | 202009004261 U1 | 1/2010 | |
| DE | 102015001811 A1 | 8/2016 | |
| EP | 2492512 A2 * | 8/2012 | ........... F04D 25/084 |
| EP | 2803260 A1 | 11/2014 | |
| GB | 2 226 954 A | 7/1990 | |
| JP | 2011208592 A | 10/2011 | |
| WO | WO-2017180974 A1 * | 10/2017 | ............... A47L 5/24 |

* cited by examiner

BLOWER APPARATUS

CROSS REFERENCE TO RELATED APPLICATION

This application claims priority of German patent application no. 10 2018 004 680.0, filed Jun. 12, 2018, the entire content of which is incorporated herein by reference.

FIELD OF THE INVENTION

The invention relates to a blower apparatus having a fan that is driven by a drive motor. The apparatus has an intake opening and a discharge opening. A handle is provided for guiding the blower apparatus with the handle being mounted on the blower apparatus such that it is pivotable from a first position into at least a second position. The blower apparatus is configured such that, during operation of the blower apparatus, an air flow passes through the discharge opening in a discharge direction.

BACKGROUND OF THE INVENTION

U.S. Pat. No. 9,138,113 discloses a vacuum/blower apparatus having a pivotable handle. Depending on whether the vacuum/blower apparatus is used as a vacuum apparatus or as a blower apparatus, the handle is pivoted into two different positions.

SUMMARY OF THE INVENTION

It is an object of the invention to provide a blower apparatus of the type described above with which it is possible to work ergonomically.

The blower apparatus of the invention includes: a fan; a drive motor driving the fan; an intake opening and a discharge opening; a handle for guiding the blower apparatus; the handle being mounted on the blower apparatus so as to permit pivoting the handle from a first position into at least a second position; the handle defining a grip region; the blower apparatus being configured to cause an air flow to pass the discharge opening in a discharge direction during operation of the blower apparatus; and, the grip region being inclined relative to the discharge direction at a first inclination in the first position and at a second inclination in the second position different than the first inclination.

According to the invention, in the first position, the grip region is inclined differently with respect to the discharge direction compared with the second position. As a result, the blower apparatus can be used in two different operating modes and the handle position can be adapted to the particular operating mode.

A large part of the force transmitted to the operator by the blower apparatus acts counter to the discharge direction. It has been shown that for different operating modes, different inclinations of the grip region relative to the discharge direction are advantageous. As a result of the two positions of the grip region, it is possible for the operator to select the inclination of the grip region appropriately for the application.

Advantageously, the grip region has an imaginary longitudinal axis. The longitudinal axis is oriented in the direction of a first direction vector in the first position and in the direction of a second direction vector in the second position. The air flow passes through the discharge opening in the direction of a third direction vector. The third direction vector points in the direction of the discharge direction.

Advantageously, a first angle, which is measured from the third direction vector to the first direction vector, and a second angle, which is measured from the third direction vector to the second direction vector, are different sizes.

Advantageously, the blower apparatus is operable selectively in a suction mode or in a blowing mode. For the suction mode, the first position of the handle is provided, and for the blowing mode, the second position of the handle is provided.

It is practical that the fan is a radial fan.

In an advantageous embodiment of the invention, the first angle and the second angle are measured from the third direction vector, arranged at the discharge opening, in the direction of the grip region, and the first angle is greater than the second angle.

Advantageously, the difference between the first angle and the second angle is greater than 10°, in particular greater than 25°, particularly advantageously greater than 90°, very particularly advantageously greater than 125°. As a result, forces that also act in the direction of the discharge direction are transmitted differently to the grip region in the first position than in the second position. As a result, the force transmission to the operator can be adapted to a particular operating mode, for example to a suction mode or a blowing mode.

Expediently, the difference between the first angle and the second angle is less than 200°, in particular less than 180°, particularly expediently less than 150°.

Advantageously, the first angle is greater than 170° and less than 220°. As a result, the longitudinal axis of the grip region can extend approximately parallel to the discharge direction. As a result, in the suction mode, the operator can grasp the grip region such that their forearm is oriented approximately orthogonally to the discharge direction. When a radial fan is used, the forearm can then be oriented approximately parallel to an intake direction of the fan. This results in particularly ergonomic guidance of the blower apparatus in the suction mode.

Advantageously, the grip region is inclined at least partially away from the discharge opening in the first position and is inclined at least partially in the direction toward the discharge opening in the second position. Advantageously, the first direction vector arranged at the handle is inclined at least partially away from the discharge opening, and the second direction vector arranged at the handle is inclined at least partially in the direction toward the discharge opening. As a result, in the first position of the grip region—for example in the suction mode—the blower apparatus can be carried comfortably in a manner hanging in the hand of an operator. In the second position of the grip region, the blower apparatus—for example in a blowing mode of a blower apparatus with a radial fan—can be carried ergonomically and comfortably by the operator such that the operator can guide the blower apparatus in the grip region and in the process can direct a blower tube arranged at the discharge opening toward the ground without overextending their wrist.

Expediently, the handle is pivotable about a pivot axis. As a result, the handle can be adjusted easily from one position into the other.

Advantageously, the handle has been pivoted through 180° about the pivot axis in the second position compared with the first position. This results in a simple structure of the blower apparatus. The longitudinal axis of the grip region can thus be arranged in a plane with the discharge direction for example both in the first and in the second position. This results in favorable force transmission to the handle. By suitably arranging the pivot axis, ergonomic arrangements of the grip region are possible both for the first position and for the second position.

In an advantageous embodiment of the invention, the pivot axis is oriented in the direction of a fourth direction vector, the fourth direction vector pointing at least partially in the direction from the discharge opening to the handle. Advantageously, a third angle between the third direction vector and the fourth direction vector is between 90° and 180°, in particular advantageously between 100° and 130°, the third angle being measured from the third direction vector, arranged at the discharge opening, in the direction of the grip region. As a result of this inclined position of the pivot axis with regard to the discharge direction, it is easily possible for the grip region to be inclined differently with respect to the discharge direction in the first position compared with the second position. To this end, the imaginary longitudinal axis of the grip region is advantageously oriented in an inclined manner with respect to the pivot axis at least in the first position or in the second position.

In an advantageous embodiment of the invention, in the longitudinal direction, the handle has a first end and a second end. In the region of the first end, an operator-controlled element for operating the drive motor is arranged. The first end points away from the discharge opening in the first position of the handle, and the first end points toward the discharge opening in the second position of the handle. As a result, the blower apparatus can be configured such that it is possible to operate the operator-controlled element with the index finger both in the suction mode and in the blowing mode when the handle is being grasped with one hand and at the same time the blower apparatus is being carried via the handle. This allows comfortable operation of the blower apparatus. Preferably, the pivot axis extends through the grip region. In an advantageous configuration, the pivot axis intersects the grip region in a section of the grip region located between the first end and the second end of the grip region.

Expediently, the operator-controlled element is arranged in a fixed position on the handle.

Expediently, the blower apparatus comprises a second handle. The second handle and the discharge opening are advantageously arranged on opposite sides of the fan. As a result, the blower apparatus can be carried with both hands. In particular in the suction mode, the blower apparatus can be guided ergonomically and reliably with one hand via the first handle and be held with the other hand via the second handle, which is arranged typically at the upper end of the blower apparatus in the suction mode. In this way, it is possible to carry a blower apparatus even in the suction mode of the blower apparatus with a radial fan, wherein the blower apparatus hangs substantially beneath the other hand of the operator. As a result, the weight force of the blower apparatus can be borne comfortably by the operator.

In an advantageous embodiment of the invention, during operation of the blower apparatus, an air flow passes through the intake opening of the fan in the form of a radial fan in the direction of a fifth direction vector. A fourth angle, which is measured from the fifth direction vector, arranged at the intake opening, to the fourth direction vector in a direction away from the discharge opening, is greater than 10°. As a result of this inclined position of the pivot axis with respect to the intake direction of a radial fan, the blower apparatus can be configured easily such that the grip region of the first position is inclined differently with respect to the discharge direction compared with the second position. To this end, the imaginary longitudinal axis of the grip region is advantageously oriented in an inclined manner with respect to the pivot axis at least in the first position or in the second position.

Advantageously, a fifth angle, which, in the first position, is measured from the fifth direction vector, arranged at the intake opening thereof, to the first direction vector in a direction away from the discharge opening, is from 80° to 130°, in particular 80° to 100°. As a result, the longitudinal axis of the grip region of the handle is oriented approximately orthogonally to the intake opening in the first position. This results, in the suction mode, in an ergonomic posture of the operator when guiding the blower apparatus via the grip region.

A further, independent concept of the invention relates to a vacuum apparatus having a fan that is driven by a drive motor, having an intake opening to which a suction tube is secured, the vacuum apparatus having at least one handle for guiding the vacuum apparatus, the vacuum apparatus having a center plane that contains a longitudinal center axis of the at least one handle, the vacuum apparatus having at least one supplemental handle.

The further invention is based on the problem of creating a vacuum apparatus of the type in question that has a simple structure and allows ergonomic operation for right-handed and left-handed people.

In order to solve the problem, the supplemental handle is held releasably on the vacuum apparatus and the vacuum apparatus has at least two receptacles for the at least one supplemental handle. The at least two receptacles comprise a first receptacle and a second receptacle. If the supplemental handle is mounted in the first receptacle of the two receptacles, it projects on a first side of a center plane of the vacuum apparatus. A supplemental handle mounted in the second of the two receptacles projects on a second, opposite side of the center plane. As a result, the supplemental handle can be arranged selectively such that it can be held comfortably with the left hand when the operator holds the handle for guiding the vacuum apparatus in their right hand, or, in an alternative configuration, be mounted such that the supplemental handle can be held with the right hand and the handle for guiding the vacuum apparatus with the left hand. As a result, ergonomic operation is possible both for right-handed and left-handed people.

Advantageously, the handle for guiding the vacuum apparatus bears at least one operator-controlled element for actuating the drive motor. The at least one supplemental handle advantageously has no operator-controlled element, and so the supplemental handle can be removed easily from the vacuum apparatus. The drive motor is advantageously arranged in a housing of the vacuum apparatus. In the normal working position of the vacuum apparatus, the center plane advantageously extends approximately vertically. The vacuum apparatus advantageously has a discharge opening, through which material drawn in via the suction tube is conveyed away. The discharge opening advantageously serves for connecting to a collecting device for vacuumed material.

A simple configuration arises when a receptacle for a supplemental handle is arranged on each side of the center plane. In a preferred configuration, the receptacles are arranged symmetrically with respect to the center plane. The supplemental handle and the receptacle are connected together via a plug connection in an advantageous configuration. As a result, the supplemental handle is easily mountable on the vacuum apparatus or detachable therefrom.

In order to achieve a defined position of the supplemental handle with respect to the housing of the vacuum apparatus, means for defining the rotational position of the supplemental handle with respect to the receptacle are advantageously provided. This is advantageous in particular when the supplemental handle is not formed in a rotationally symmetric manner, but for example extends in a slightly curved manner. As a result, an ergonomic handhold on the supplemental handle can be achieved. As a result of the means for defining the rotational position of the supplemental handle with respect to the receptacle, correct mounting of the supplemental handle in the receptacle and thus ergonomic operation can be achieved easily.

Provision may be made for the vacuum apparatus to have a first supplemental handle for fixing in the first receptacle and a second supplemental handle for arranging in the second receptacle. This is advantageous in particular when the supplemental handles are not configured identically on both sides of the center plane. The first and the second receptacle can in this case be formed differently or identically. In a preferred configuration, a supplemental handle is provided to be mounted selectively in the first receptacle or the second receptacle. Since, during operation, either a supplemental handle in the first receptacle or a supplemental handle in the second receptacle is required, a single supplemental handle for selectively arranging in both receptacles is sufficient. As a result, the number of individual parts of the vacuum apparatus can be reduced. The supplemental handle is advantageously arranged closer to an inlet opening into the suction tube than the handle is. The distance, measured in the direction of the longitudinal center axis of the suction tube, of the supplemental handle from an inlet opening into the suction tube of the vacuum apparatus is preferably less than the distance, measured in the direction of the longitudinal center axis of the suction tube, of the handle. As a result, in a normal working posture, the hand of the operator that is guiding the vacuum apparatus at the handle is further away from the inlet opening into the suction tube, that is, arranged further back with respect to the operator, than the hand guiding the vacuum apparatus at the supplemental handle.

The vacuum apparatus advantageously has a transverse plane that contains the longitudinal center axis of the suction tube and is arranged perpendicularly to the center plane. The supplemental handle is advantageously arranged above the transverse plane in the normal working posture during suction operation of the vacuum apparatus. The handle is advantageously arranged close to the transverse plane. Advantageously, the handle is at a distance of less than 10 cm from the transverse plane. In a preferred configuration, the handle is intersected by the transverse plane. The hand of the operator that is holding the vacuum apparatus at the handle is thus arranged further down than the hand of the operator that is holding the vacuum apparatus at the supplemental handle. This results in an ergonomic handhold.

The drive motor is advantageously a battery-driven electric motor. The expression "battery" is in the present case used as an umbrella term for individual battery cells and battery blocks made up of several battery cells. The battery is advantageously arranged at least partially above the transverse plane in a normal working posture during suction operation. Preferably, the battery is arranged entirely above the transverse plane. This results in a compact structure and an ergonomic weight distribution of the vacuum apparatus. The battery is advantageously held releasably in a battery bay. As a result, the battery can be replaced easily. The battery bay is advantageously open toward the outer side of the housing, such that the battery can be replaced without the housing being opened. The battery bay is advantageously formed in a housing section of the housing of the vacuum apparatus at which at least one extension is formed. At least one receptacle is advantageously formed at the extension. The extension is advantageously arranged next to a wall, delimiting the battery bay, of the housing and formed integrally with the wall.

Advantageously, in a normal working posture during suction operation, the battery is arranged at least partially above the drive motor.

The supplemental handle has a center axis that advantageously encloses an angle of at least 30° with the center plane. Advantageously the angle that the supplemental handle encloses with the center plane is at least 60°, in particular at least 80°. With a curved profile of the center axis of the supplemental handle, the specified angle is realized in at least one region, advantageously in all regions of the supplemental handle.

In a preferred configuration, the vacuum apparatus is a vacuum/blower apparatus that is convertible for use in blowing operation.

The center plane advantageously contains the longitudinal center axis of the suction tube. In a preferred configuration, the center plane contains the rotational axis of a fan wheel of the fan of the vacuum apparatus. In a normal working position of the vacuum apparatus, the center plane advantageously extends approximately vertically.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
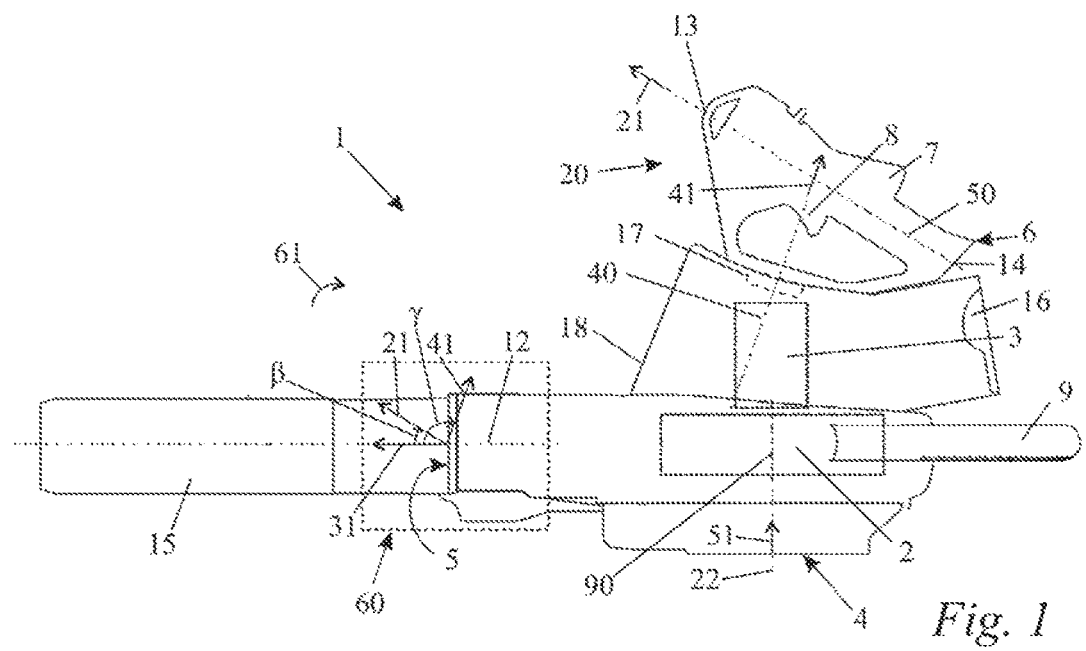
FIG. 1 shows a schematic of a blower apparatus in the blowing mode.

FIG. 1 shows a schematic side view of a blower apparatus 1 having a fan 2. The blower apparatus 1 can be operated both in a suction mode and in a blowing mode. The suction mode and blowing mode are two different working modes of the blower apparatus 1. The fan 2 is arranged in a housing 18 of the blower apparatus 1. The fan 2 is driven via a drive motor 3. In the embodiment, the drive motor 3 is embodied as an electric motor. The electric motor is supplied with power in particular by a battery 16. However, the electric motor can also be supplied with power via an electric line. Provision may also be made, however, for the fan to be driven via a combustion engine, in particular via a two-stroke engine or a mixture-lubricated four-stroke engine. During operation, the fan 2 draws in air via an intake opening 4 and blows it out via a discharge opening 5. In the process, an air flow 22 passes through the intake opening 4 in an intake direction. An air flow 12 passes through the discharge opening 5 in a discharge direction. In FIG. 1, the blower apparatus 1 is being operated in the blowing mode. In this case, a blower tube 15 is arranged at the discharge opening 5. The air flow 12 flows into the blower tube 15 at the discharge opening 5.

Figure 2:
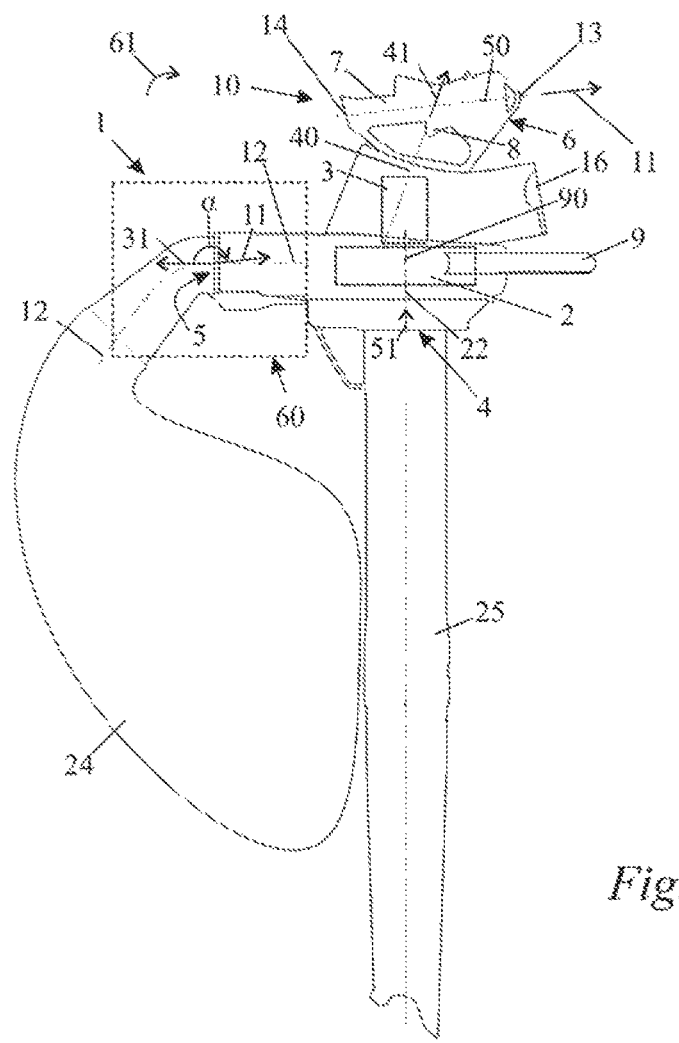
FIG. 2 shows a schematic of the blower apparatus from FIG. 1 in the suction mode.

In FIG. 2, the blower apparatus 1 is illustrated in the suction mode. As illustrated in FIG. 2, during operation in the suction mode, rather than the blower tube 15, it is possible for a collection bag 24, for example, to be arranged at the discharge opening 5. In the suction mode, a suction tube 25 is arranged at the intake opening 4. The air flow 22 passes through the suction tube 25 and passes from there through the intake opening 4 to the fan 2. The air flow 22 leaves the fan 2 as an air flow 12 and flows through the discharge opening 5 into the collection bag 24. By way of the air flow 22 created by the fan 2, objects such as leaves, for example, can be drawn in. Provision may be made for the fan 2 to chop up these objects into small pieces such that they can be collected in a compact form in the collection bag 24.

The blower apparatus 1 comprises a handle 6. The handle 6 is mounted on the housing 18. The handle 6 has a grip region 7. An operator can grasp the grip region 7 with the fingers of the hand. The grip region can be of any desired shape, for example including curved. However, in any case, the grip region 7 has an imaginary longitudinal axis 50. The longitudinal axis 50 extends approximately in the longitudinal direction of the grip region 7. During operation of the blower apparatus 1 in the suction mode, the handle 6 is typically in a first position 10. In the first position 10 of the handle 6, the longitudinal axis 50 of the grip region 7 is oriented in the direction of a first direction vector 11.

The handle 6 is mounted on the blower apparatus 1 so as to be pivotable about a pivot axis 40. To this end, a pivot bearing 17, schematically illustrated in FIG. 1, is provided, which can be formed for example by a stub on the handle 6, which is mounted in a receptacle of the housing 18 of the blower apparatus 1. As a result of a pivoting movement about the pivot axis 40, the handle 6 can be pivoted from the first position 10 illustrated in FIG. 2 into a second position 20 illustrated in FIG. 1. The handle 6 has been pivoted through 180° about the pivot axis 40 in the second position 20 compared with the first position 10. During operation of the blower apparatus 1 in the blowing mode, the handle 6 is typically in the second position 20. In the second position 20, the longitudinal axis 50 of the grip region 7 of the handle 6 is oriented in the direction of a second direction vector 21. The air flow 12 passes through the discharge opening 5 in the direction of a third direction vector 31. The discharge direction points in the direction of the third direction vector 31. The first direction vector 11 and the third direction vector 31 enclose a first angle $\alpha$ illustrated in FIG. 2. The angle $\alpha$ is measured from the third direction vector 31, arranged at the discharge opening 5, to the first direction vector 11 in the direction 61 of the grip region. The direction 61 extends around the circumference of a circle that is arranged in the plane 60 and the central point of which is arranged at the center of the discharge opening 5. The second direction vector 21 and the third direction vector 31 enclose an angle $\beta$ shown in FIG. 1. The angle $\beta$ is measured from the third direction vector 31, arranged at the discharge opening 5, to the second direction vector 21 in the direction 61 of the grip region. The angle $\alpha$ and the angle $\beta$ are different sizes. As a result, the grip region 7 is inclined differently with respect to the discharge direction in the first position 10 compared with the second position 20.

Figure 3:
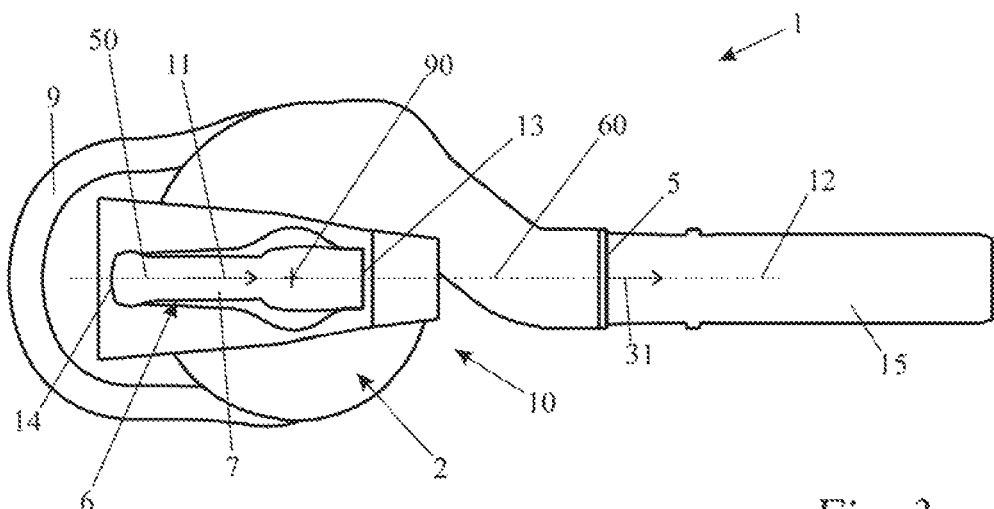
FIG. 3 shows a schematic from above of a handle of a blower apparatus according to FIG. 1.

FIG. 3 shows a view from above looking in the direction of a rotational axis 90 of the fan 2. The handle 6 is in the first position 10. In the embodiment, the longitudinal axis 50 and the air flow 12 as it passes through the discharge opening 5 are arranged in a plane 60 illustrated in FIGS. 1 to 3. However, provision may also be made for the air flow at the discharge opening 5 and the longitudinal axis 50 of the grip region 7 to be arranged in two different planes. Advantageously, the different planes extend parallel to one another. Since the air flow 12 at the discharge opening 5 and the longitudinal axis 50 of the grip region 7 are arranged in the plane 60, the first direction vector 11 and the third direction vector 31 are consequently also located in the plane 60. The plane 60 is defined by the first direction vector 11 and the third direction vector 31. As illustrated in FIG. 1, the longitudinal axis 50 of the grip region 7 and the air flow 12 at the discharge opening 5 are also located in the common plane 60 in the second position of the handle 6. Accordingly, the second direction vector 21 and the third direction vector 31 are also located in the common plane 60.

The pivot axis 40 is oriented in the direction of a fourth direction vector 41. The fourth direction vector 41 points at least partially in the direction from the discharge opening 5 to the handle 6. A third angle $\gamma$ between the third direction vector 31 and the fourth direction vector 41 is between 90° and 180°. Advantageously, the third angle $\gamma$ is between 100° and 135°. In the embodiment, the third angle $\gamma$ is between 100° and 130°. The third angle $\gamma$ is measured from the third direction vector 31 arranged at the discharge opening 5 in the direction 61 of the grip region 7.

As illustrated in FIG. 1, in the longitudinal direction, that is, in the direction of the longitudinal axis 50, the handle 6 has a first end 13 and a second end 14. Arranged in the region of the first end 13 is an operator-controlled element 8 for operating the drive motor 3. In the second position 20 of the handle 6, the first end 13 of the handle 6 points toward the discharge opening 5. As illustrated in FIG. 2, the first end 13 points away from the discharge opening 5 in the first position 10 of the handle 6. The operator-controlled element 8 is arranged in a fixed position on the handle 6. The operator-controlled element 8 does not change its position in relation to the handle 6. When the handle 6 is rotated, the operator-controlled element 8 rotates conjointly therewith. As FIGS. 1 and 2 show, the pivot axis 40 intersects the grip region 7 between its ends 13 and 14. In the first position 10 and in the second position 20, the grip region 7 is arranged on the opposite side of the housing 18 from the intake opening 4.

As illustrated in FIG. 3, in addition to the handle 6, the blower apparatus 1 comprises a second handle 9. The second handle 9 and the discharge opening 5 are arranged on opposite sides of the fan 2. As a result, the recoil force of the air flow 12 emerging from the blower tube 15 can be reacted to very easily by the operator by means of the handle 9. The second handle 9 is configured in a substantially U-shaped manner. The two ends of the second handle 9 are fixed to the blower apparatus 1 on opposite sides of the plane 60. In this way, the handle 9 passes around the fan 2.

Figure 4:
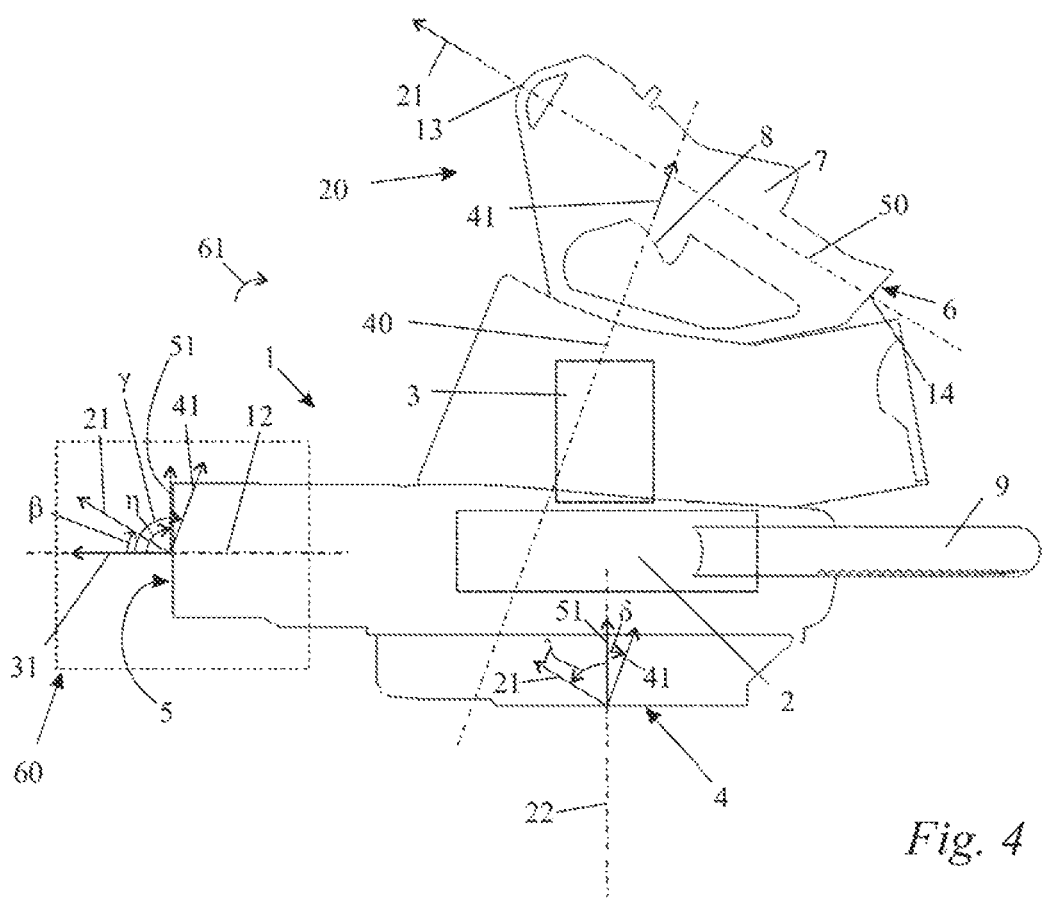
FIG. 4 shows the blower apparatus from FIG. 1 with the blower tube removed.
Figure 5:
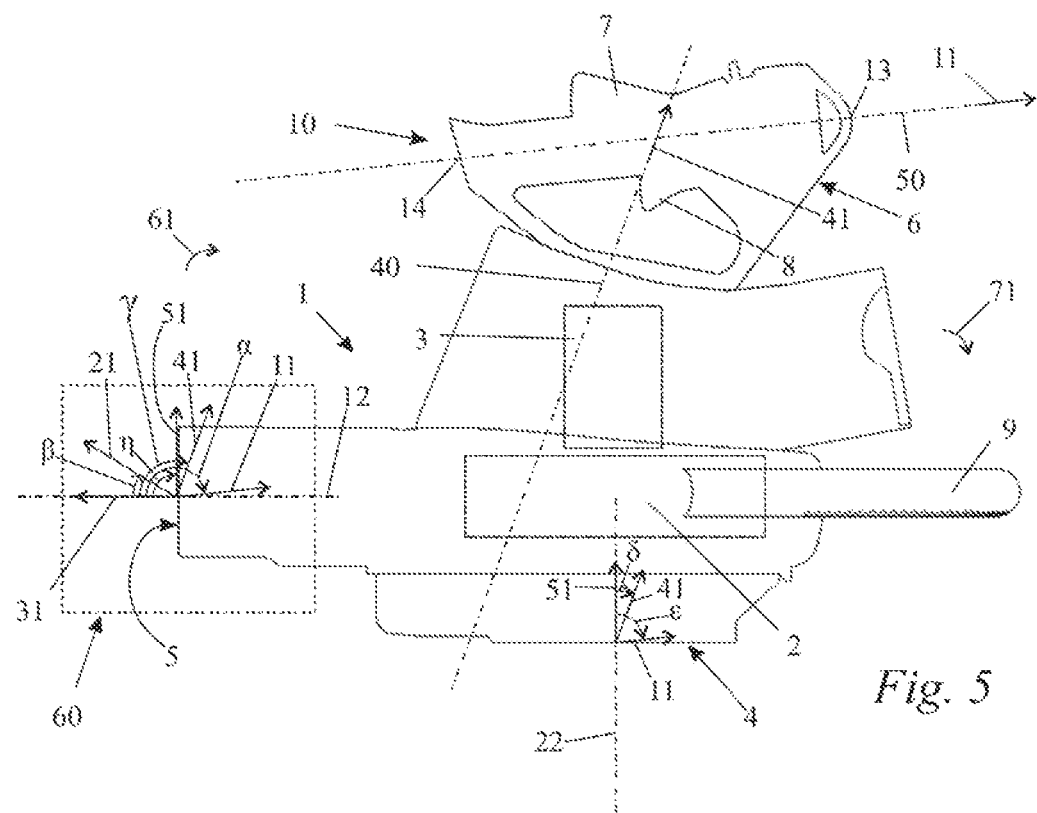
FIG. 5 shows the blower apparatus of FIG. 2 with the suction tube removed.

FIGS. 4 and 5 show enlarged illustrations of the blower apparatus 1 with the blower tube removed, the suction tube removed and the collection bag removed. FIG. 4 shows the handle 6 in the second position 20, and FIG. 5 shows the handle 6 in the first position 10. It is clear from a comparison of FIGS. 4 and 5 that, in the first position 10, the grip region 7 is inclined at least partially away from the discharge opening 5 and that, in the second position 20, the grip region 7 is inclined at least partially in the direction toward the discharge opening 5. Accordingly, the first direction vector 11 arranged at the grip region 7 is inclined at least partially away from the discharge opening 5 and the second direction vector 21 arranged at the grip region 7 is inclined at least partially in the direction toward the discharge opening 5. When the grip region 7 is inclined away from the discharge opening 5, the first end 13 of the handle 6 is arranged further away from the discharge opening 5 and further away from the intake opening 4 than the second end 14 of the handle 6. When the grip region 7 is inclined toward the discharge opening 5, the second end 14 of the handle 6 is arranged further away from the discharge opening 5 than the first end 13 of the handle 6, and the first end 13 is arranged further away from the intake opening 4 than the second end 14 of the handle 6.

As illustrated in FIG. 1, in the longitudinal direction, that is, in the direction of the longitudinal axis 50, the handle 6 has a first end 13 and a second end 14. Arranged in the region of the first end 13 is an operator-controlled element 8 for operating the drive motor 3. In the second position 20 of the handle 6, the first end 13 of the handle 6 points toward the discharge opening 5. As illustrated in FIG. 2, the first end 13 points away from the discharge opening 5 in the first position 10 of the handle 6.

As illustrated in FIG. 5, the first angle $\alpha$ and the second angle $\beta$ are measured from the third direction vector 31, arranged at the discharge opening 5, in the direction 61 of the grip region 7. In FIG. 5, in addition to the first direction vector 11, which indicates the direction of the longitudinal axis 50 of the grip region 7 in the first position 10, assigned to the suction mode, of the handle 6, the second direction vector 21, which shows the direction of the longitudinal axis 50 in the second position 20, assigned to the blowing mode, of the grip region of the handle 6, is also indicated. The first angle $\alpha$ is greater than the second angle $\beta$. The first angle $\alpha$ is between 90° and 270°. Advantageously, the first angle $\alpha$ is between 135° and 225°. Particularly advantageously, the first angle $\alpha$ is between 170° and 220°. In the embodiment, the first angle $\alpha$ is greater than 170° and less than 190°. The second angle $\beta$ is between 0° and 90° or between 270° and 360°. Advantageously, the second angle $\beta$ is between 0° and 45° or between 315° and 360°. In the embodiment, the second angle $\beta$ is between 20° and 40°.

The handle 6 can be pivoted from the first position 10 shown in FIG. 5 into the second position 20 shown in FIG. 4 by a pivoting movement about the pivot axis 40. The pivot axis 40 is inclined with respect to the direction of the air flow 22 at the intake opening 4. The air flow 22 passes through the intake opening 4 in the direction of a fifth direction vector 51. A fourth angle $\delta$, which is measured from the fifth direction vector 51, arranged at the intake opening 4, to the fourth direction 41 in the direction 71 away from the discharge opening 5, is greater than 10°. Advantageously, the fourth angle $\delta$ is less than 90°. In the embodiment, the fourth angle $\delta$ is less than 30°.

In the first position 10, the longitudinal axis 50 of the grip region 7 of the handle 6 is oriented approximately orthogonally to the intake direction of the air flow 22. A fifth angle $\epsilon$, which is measured, in the first position 10, from the fifth direction vector 51, arranged at the intake opening 4, to the first direction vector 11 in a direction 71 away from the discharge opening 5, is from 80° to 130°, in particular from 80° to 100°. The direction 71 extends around a circumference of a circle, the central point of which is arranged at the center of the intake opening 4 and which extends in the plane 60.

In the embodiment, the fan 2 is a radial fan. The air flow 22 is deflected in total through about 90° by the fan 2 from the intake opening 4 to the discharge opening 5 and leaves the fan 2 in the direction of the air flow 12. As illustrated in FIG. 5, the third direction vector 31 and the fifth direction vector 51 enclose a sixth angle $\eta$ of between 80° and 100°. The sixth angle r is measured from the third direction vector 31, arranged at the discharge opening 5, in the direction 61 of the grip region 7.

Figure 6:
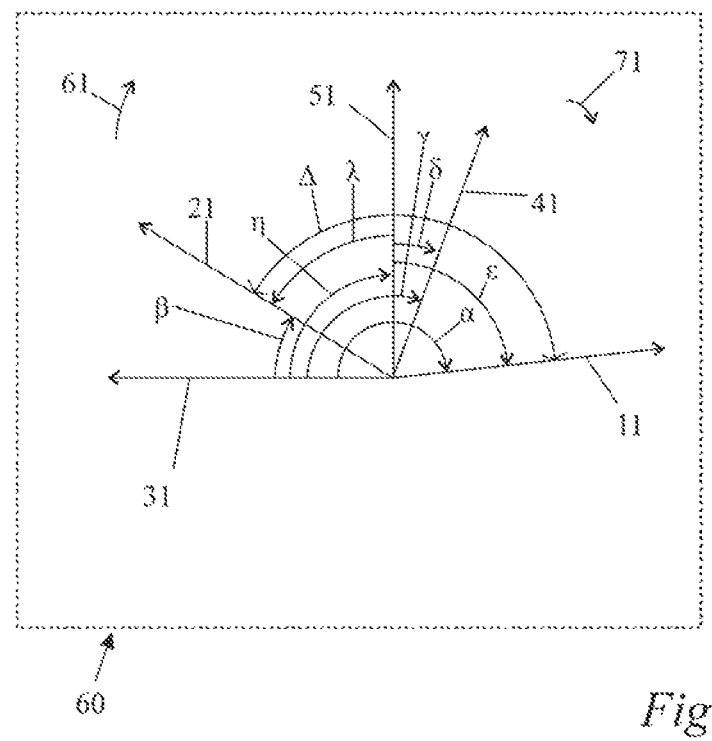
FIG. 6 shows an overview of different direction vectors—for example the orientation of the longitudinal axis of the handle and of the discharge direction—and the angle between these direction vectors.

FIG. 6 shows an overview of the orientation of the direction vectors 11, 21, 31, 41, 51 with respect to one another and the different angles between these direction vectors. In the embodiment, the position vectors that can be assigned to the direction vectors 11, 21, 31, 41, 51 are all arranged in the same plane 60. However, provision can also be made for the position vectors that can be assigned to the direction vectors 11, 21, 31, 41, 51 to be arranged in different planes. In this case, the respective direction vectors and the angles between these direction vectors are comparable in a single plane. To this end, the starting points of all the direction vectors should be positioned at a single point. The direction vectors arranged in such a way advantageously define a common plane.

As can be gathered from the overview according to FIG. 6, a difference $\Delta$ between the first angle $\alpha$ and the second angle $\beta$ is greater than 10°. Advantageously, the difference $\Delta$ is greater than 25°. Particularly advantageously, the difference $\Delta$ is greater than 90°. In the embodiment, the difference $\Delta$ is greater than 125°. Furthermore, the difference $\Delta$ is less than 270°, in particular less than 200°. Particularly advantageously, the difference $\Delta$ is less than 180°. In the embodiment, the difference $\Delta$ is less than 150°.

A seventh angle $\lambda$, which is measured from the fifth direction vector 51, arranged at the intake opening 4, counter to the direction 71 toward the second direction vector 21, is between 0° and 90°. Advantageously the angle λ is between 30° and 80°. In the embodiment, the angle λ is between 50° and 70°.

Figure 7:
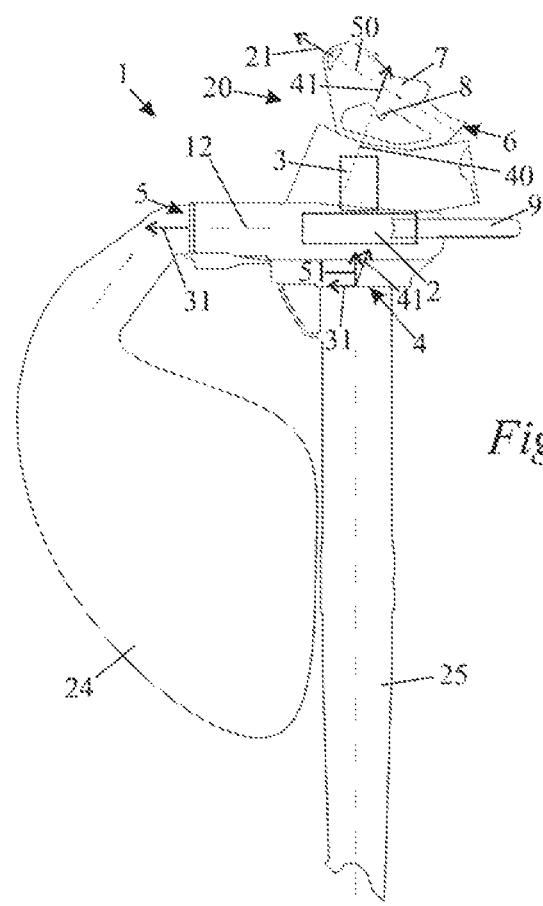
FIG. 7 shows a view of a blower apparatus with the suction tube and a collection bag mounted, wherein the handle is in the second position.
Figure 8:
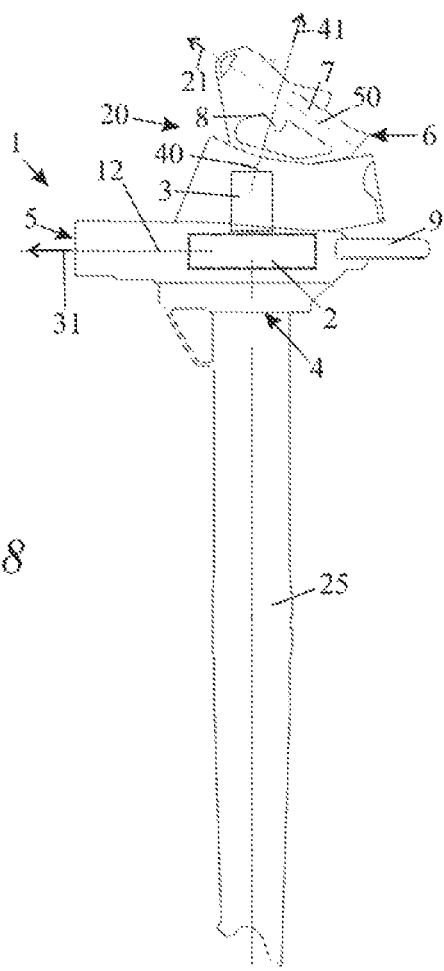
FIG. 8 shows the blower apparatus according to FIG. 7 with the collection bag removed.

Starting from the suction mode illustrated in FIG. 2, the blower apparatus 1, as described in the following text, can be converted for the blowing mode illustrated in FIG. 1. First, the handle 6 is pivoted through 180° about the pivot axis 40. The handle 6 is then in its second position 20, as illustrated in FIG. 7. Next, the collection bag 24 is removed from the discharge opening 5. The blower apparatus 1 is then in the state illustrated in FIG. 8. Next, the suction tube 25 is removed from the intake opening 4. The blower apparatus 1 is then in the state illustrated in FIG. 4. Finally, the blower tube 15 is placed on the discharge opening 5, as illustrated in FIG. 1. The blower apparatus 1 can now be operated in the blowing mode.

In the states of the blower apparatus 1 that are contrasted in FIG. 1 and FIG. 2, the grip region 7 of the handle 6 is in each case oriented very well for the blower apparatus 1 to be carried and operated ergonomically by an operator in each working mode. In the blowing mode illustrated in FIG. 1, the operator can grip the handle 6 from above and carry the blower apparatus 1 in a hanging manner. As a result of the slight inclined position of the longitudinal axis 50 of the grip region 7 with respect to the discharge direction, the longitudinal axis 50 can be oriented horizontally during operation. In this way, it is possible to carry the blower apparatus 1 comfortably and ergonomically in the blowing mode. At the same time, the discharge direction points downward in the direction of the ground with the longitudinal axis 50 oriented horizontally. As a result, objects to be blown can be aimed at with the blower tube 15 without the longitudinal axis 50 of the grip region 7 being tilted. In the suction mode illustrated in FIG. 2, the operator grips the handle 6 such that their forearm and the intake direction, pointing in the direction of the fifth direction vector 51, lie substantially on one line. As a result, the suction tube 25 can be directed accurately at objects to be drawn in. The forces that arise while the fan 2 is being operated in the suction mode can be reacted very easily by the operator.

Figure 9:
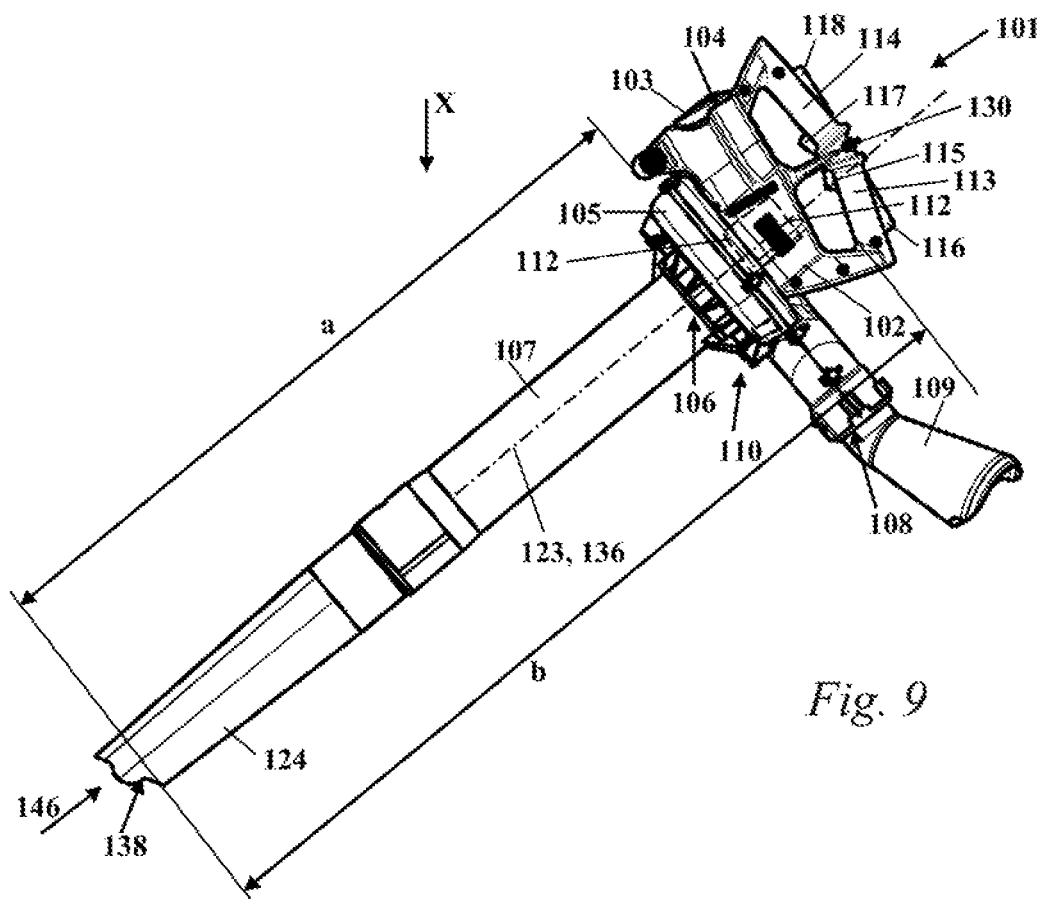
FIG. 9 shows a side view of a vacuum apparatus according to a further, independent concept of the invention.

FIG. 9 shows, as an embodiment of the further concept of the invention, a vacuum/blower apparatus 101. A vacuum/blower apparatus is a vacuum apparatus that is convertible into a blower apparatus by exchanging fittings. The vacuum/blower apparatus 101 has a housing 102, on which two handles 113, 114 for guiding the vacuum/blower apparatus 101 during operation are arranged. FIG. 9 shows the vacuum/blower apparatus in a first configuration 110 for suction operation. In the first configuration 110, the vacuum/blower apparatus 101 can be guided using the first handle 113. Arranged on the first handle 113 is a first operator-controlled element 115 for controlling a drive motor 112 arranged in the housing 102 and shown schematically in FIG. 9. Also mounted on the first handle 113 is a first blocking element 116. The first operator-controlled element 115 can advantageously only be actuated when the first blocking element 116 is pressed. Provided in a corresponding manner on the second handle 114 are a second operator-controlled element 117 for controlling the drive motor 112 during blowing operation and a second blocking element 118 that blocks the second operator-controlled element 117 for controlling the drive motor when it is in a state in which it is not actuated and not pressed. Furthermore, in the region between the two handles 113 and 114, a blocking button 130 is arranged, which can be actuated from both handles 113, 114.

In order to supply the drive motor with power, a battery 103 is arranged in the housing 102. The battery 103 is guided in a battery bay 104 that is open toward the housing outer side, such that the battery 103 can be replaced easily without the housing 102 being opened. The vacuum/blower apparatus 101 has a blower spiral 105, which can be formed at least partially integrally with the housing 102. The blower spiral 105 has an intake opening 106 and a discharge opening 108. Fixed at the intake opening 106 is a suction tube 107. Arranged at the suction tube 107 in the embodiment is a suction nozzle 124, which has an inlet aperture 138. Through the inlet aperture, during suction operation, air and suction material are drawn into the blower spiral 105 in the direction of the arrow 146. The blower spiral 105 has a discharge opening 108, through which suction material and drawn-in air are discharged through a collection bag support 109 and a collection bag (not shown) to be arranged on the collection bag support 109. The suction tube 107 has a longitudinal center axis 123. In the side view in FIG. 9, the longitudinal center axis 123 coincides with a transverse plane 136, which will be described in more detail in the following text. The transverse plane 136 extends perpendicularly to the plane of the page.

Figure 10:
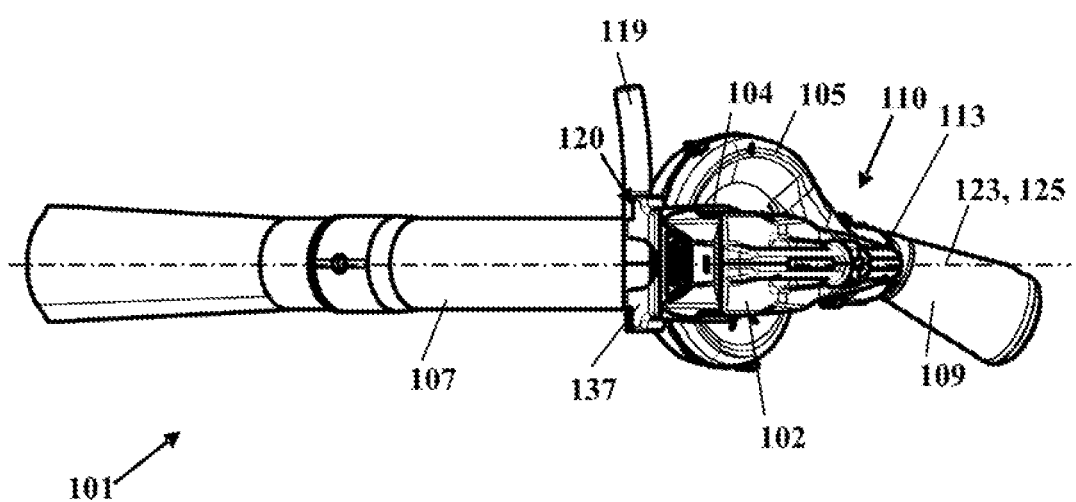
FIG. 10 shows a plan view of the vacuum apparatus from FIG. 9 in the direction of the arrow X in FIG. 9.

As FIG. 10 shows, the longitudinal center axis 123 of the suction tube 107 lies in a center plane 125 of the vacuum/blower apparatus 101. Formed on the housing 102, specifically on the battery bay 104, is an extension 137, on which a receptacle 120 for a supplemental handle 119 is formed. FIGS. 9 and 10 show the vacuum/blower apparatus in a configuration for a left-handed person. The operator can grip the handle 113 with their left hand and the supplemental handle 119 with their right hand. As a result, an ergonomic handhold is achieved.

Figure 11:
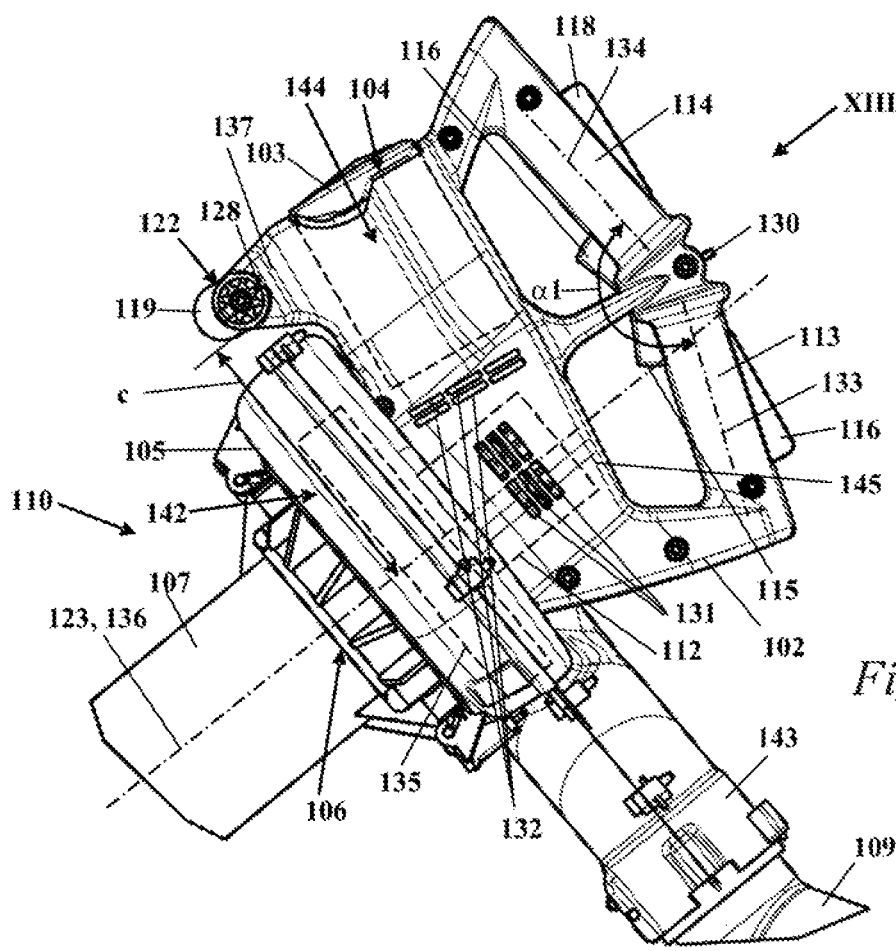
FIG. 11 shows an enlarged detail from FIG. 9.

FIG. 11 shows the configuration of the vacuum/blower apparatus in detail. As FIG. 11 schematically shows, the drive motor 112 drives a fan 142. The fan 142 comprises a fan wheel 135 that is arranged in the blower spiral 105 and driven in rotation. The fan 142 is in the form of a radial fan, which, in the axial direction of the blower spiral 105, draws in air and suction material such as leaves or the like, and discharges the latter in a radial direction or circumferential direction through the blower spiral 105. In the embodiment, the fan wheel 135 is driven in rotation about the longitudinal center axis 123 of the suction tube 107. The blower spiral 105 has a discharge support 143, which is arranged at a distance from the longitudinal center axis 123 and through which the drawn-in air and suction material can leave the blower spiral 105 in the radial direction toward the longitudinal center axis 123. The collection bag support 109 is fastened releasably to the discharge support 143.

As FIG. 11 shows, the battery 103 is arranged above the transverse plane 136. The battery bay 104 is formed in a housing section 144 that, in the embodiment, is likewise arranged entirely above the transverse plane 136 in a normal working posture for suction operation. As FIG. 11 also shows, the housing 102 has cooling air openings 131 in a housing section 145 in which the drive motor 112 is arranged. Arranged in a region between the housing sections 144 and 145 are cooling air openings 132.

As FIG. 11 also shows, on the opposite side from the supplemental handle 119, a receptacle 122 for the alternative arrangement of the supplemental handle 119 is arranged. Into the receptacle 122 there projects a web 128 that serves for securing the rotational position of the supplemental handle 119 in the receptacle 122. As a result, the supplemental handle 119 can be mounted in the receptacle 122 only in an orientation predetermined by the configuration. As FIG. 11 also shows, the supplemental handle 119 is also at a distance c from the transverse plane 136. In this case, in the normal working position, shown in FIG. 11, of the vacuum/blower apparatus 101 for suction operation, that is, in the first configuration 110, the supplemental handle 119 is arranged above the transverse plane 136. In the embodiment, the supplemental handle 119 is arranged partially above the blower spiral 105. As FIG. 12 shows, the supplemental handle 119 is also arranged in a manner offset forward with respect to the blower spiral 105, such that an operator can comfortably grip the supplemental handle 119 past the top side of the blower spiral 105.

The first handle 113 has a longitudinal center axis 133, and the second handle 114 has a longitudinal center axis 134. The longitudinal center axes 133 and 134 of the two handles 113 and 114 enclose an angle α1 with one another. The angle α1 is advantageously 90° to 180°. Advantageously, the angle α1 is 120° to 170°, in particular 140° to 160°. As a result, ergonomic handholds are achieved both for suction operation and for blowing operation. The second handle 114 is arranged entirely above the transverse plane 136. The first handle 113 is advantageously arranged in the vicinity of the transverse plane 136 and is in particular at a distance of less than 10 cm, in particular less than 5 cm from the transverse plane. In a preferred configuration, the first handle 113 projects through the transverse plane 136 and is intersected by the transverse plane 136.

Figure 12:
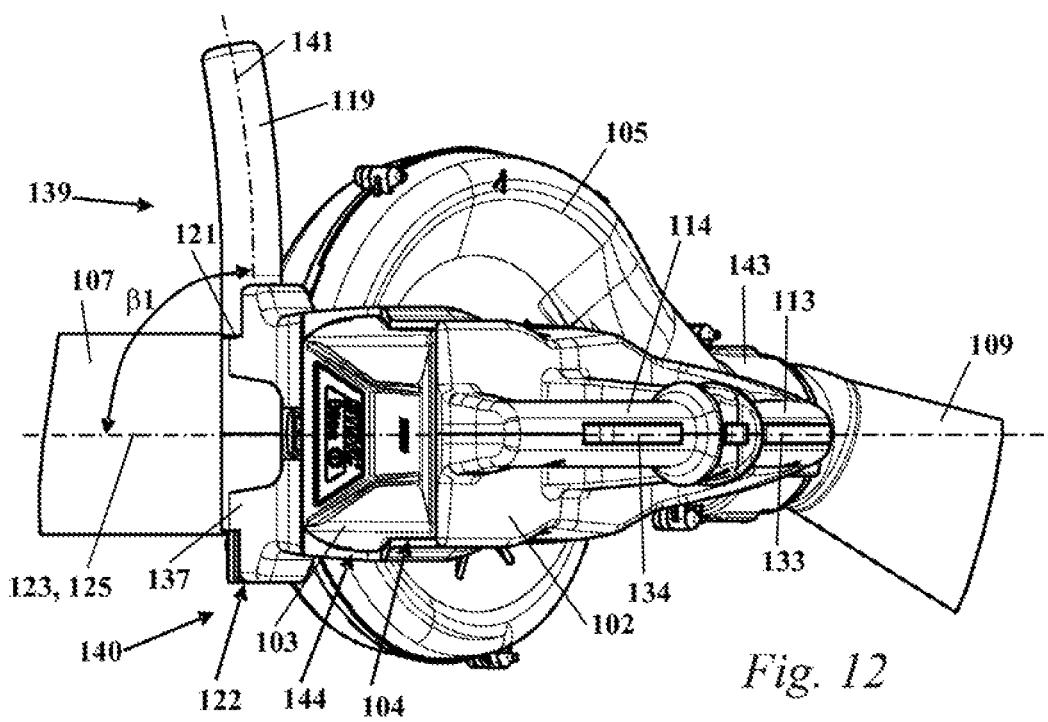
FIG. 12 shows an enlarged detail from FIG. 10.

FIG. 12 shows the position of the center plane 125. The center plane 125 contains the longitudinal center axis 123 of the suction tube 107 and the longitudinal center axis 133 of the first handle 113. In the embodiment, the longitudinal center axis 134 of the second handle 114 also lies in the center plane 125. In a normal working position of the vacuum/blower apparatus 101 during suction operation, the center plane 125 is oriented vertically. The center plane 125 contains preferably the rotational axis of the fan wheel 135 of the fan 142. In the embodiment, the rotational axis of the fan wheel 135 coincides with the longitudinal center axis 123 of the suction tube 107.

FIG. 12 shows the arrangement of the extension 137 on the housing section 144 forming the battery bay 104. As FIG. 12 shows, the extension 137 is formed in a mirror-symmetric manner to the center plane 125. Preferably, the housing 102 is also formed in a largely mirror-symmetric manner to the center plane 125. In the arrangement shown in FIG. 12 for a left-handed person, the supplemental handle 119 is arranged on a first side 139 of the center plane 125 that is arranged to the right of the center plane 125 from the operator's point of view in a normal working position. No supplemental handle 119 is arranged in the associated receptacle 122 on the opposite, left side 140 of the center plane 125. The supplemental handle 119 has a center axis 141. In the embodiment, the supplemental handle 119 is curved slightly forward, that is, in the direction of the suction tube 107, from the extension 137. The center axis 141 has a slightly curved profile as a result. A straight profile of the center axis 141 can also be advantageous. The supplemental handle 119 is held in a receptacle 121 of the extension 137, advantageously via a plug connection. The center axis 141 of the supplemental handle 119 encloses an angle β1 with the center plane 125 that is at least 30° at least in the region of the supplemental handle 119 adjoining the receptacle 121. Advantageously, the angle β1 in the region of the supplemental handle 119 adjoining the receptacle 121 is at least 60°, in particular at least 80°. In a preferred configuration, the angle β1 is at least 30°, in particular at least 60° at every point of the center axis 141.

As FIG. 12 also shows, the discharge support 143 is intersected centrally by the center plane 125. The collection bag support 109 projects on the left side 140, remote from the supplemental handle 119, of the center plane 125. As a result, an operator can stand comfortably on the right side 139 of the center plane 125 and guide the vacuum/blower apparatus 101 during suction operation.

Figure 13:
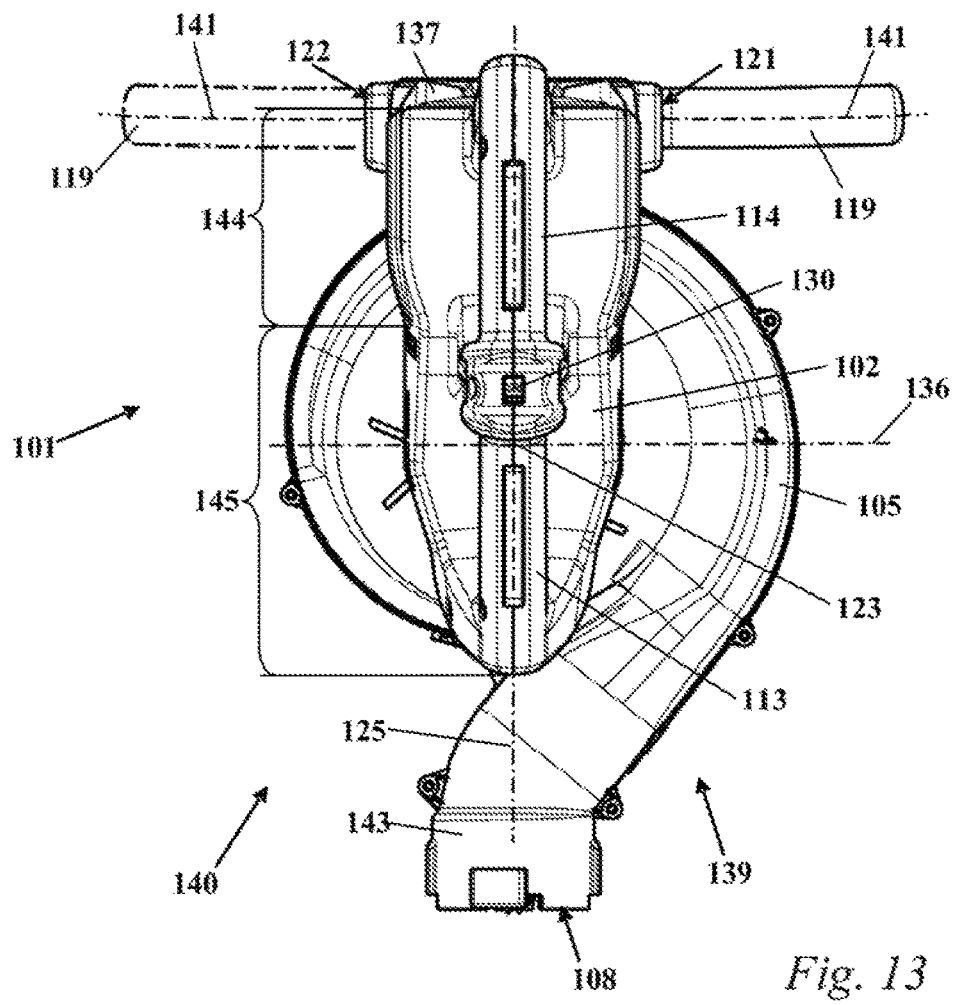
FIG. 13 shows a side view in the direction of the arrow XIII in FIG. 11, the second position of the supplemental handle being indicated by a dot-dashed line.

FIG. 13 shows a view of the vacuum/blower apparatus 101 from the side remote from the suction tube 107 in the direction of the longitudinal center axis 123 of the suction tube 107. As FIG. 13 shows, the transverse plane 136 and the center plane 125 are arranged perpendicularly to one another. Both the center plane 125 and the transverse plane 136 contain the longitudinal center axis 123 of the suction tube 107 (not visible in FIG. 13) arranged behind the blower spiral 105. The housing section 144 is arranged entirely above the transverse plane 136. The housing section 145 projects through the transverse plane 136 and is intersected by the transverse plane 136. In the embodiment, the blocking button 130 is also located above the transverse plane 136.

As FIG. 13 shows, the receptacles 121 and 122 are arranged on the extension 137 on both sides of the center plane 125. In the configuration for a left-handed person, the supplemental handle 119 drawn with a solid line is arranged in the receptacle 121 on the right side 139 of the center plane 125. If the vacuum/blower apparatus is intended to be operated by a right-handed person, the supplemental handle 119 can be released from the receptacle 121 and arranged in the receptacle 122 on the left side 140 of the center plane 125. This arrangement of the supplemental handle 119 is drawn with a dot-dashed line in FIG. 13. Preferably, a single supplemental handle 119 for selectively arranging in the receptacle 121 or the receptacle 122 is provided. The arrangement of the supplemental handle 119 on the two sides of the center plane 125 is thus mirror-symmetric to the center plane 125.

Figure 14:
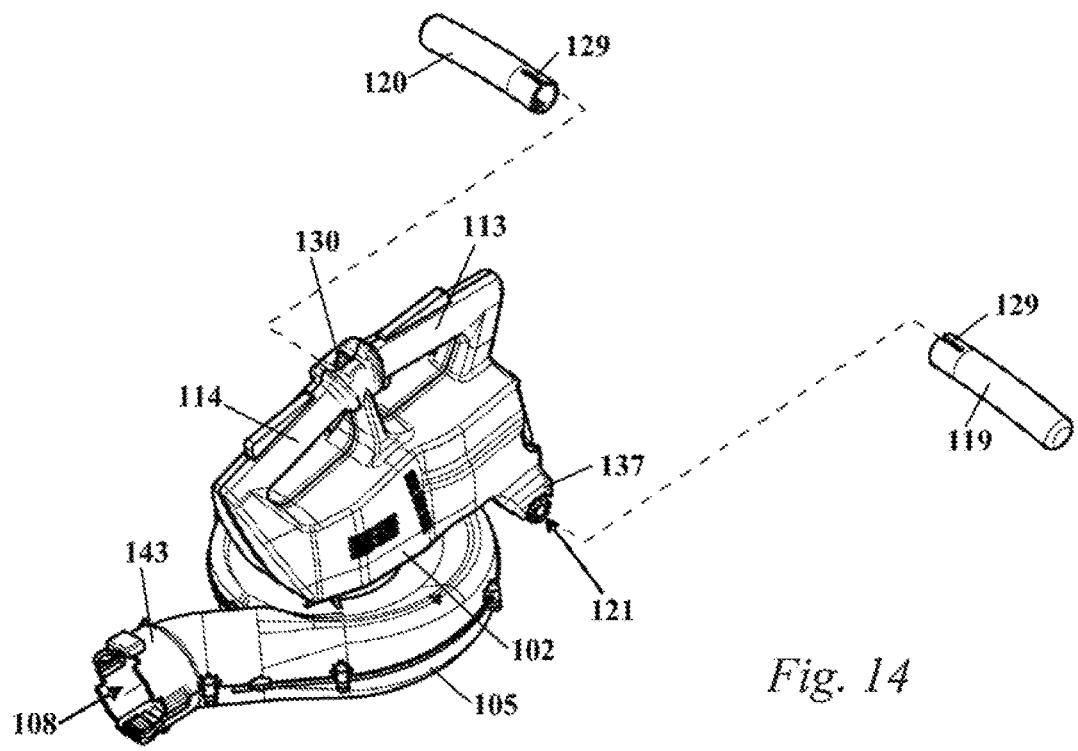
FIG. 14 shows an exploded view of the vacuum apparatus from FIG. 9 without the fittings arranged at the blower spiral, two supplemental handles for selectively fixing to the vacuum apparatus being shown.

FIG. 14 shows a configuration in which a second supplemental handle 120 for arranging in the receptacle 122 is provided. The supplemental handles 119 and 120 can in this case be formed identically or differently. As FIG. 14 also shows, the supplemental handles 119, 120 have a slit 129. With the supplemental handle 119, 120 arranged in the associated receptacle 121, 122, the web 128 (FIG. 11) projects into the slit 129 and as a result secures the rotational position of the supplemental handle 119, 120. As FIGS. 11 and 14 also show, the receptacles 121 and 122 are in the form of recesses, into which the supplemental handles 119, 120 can be plugged. The supplemental handles 119, 120 are accordingly held on the housing 102 via a plug connection and can be easily mounted on and removed from the housing 102.

Figure 15:
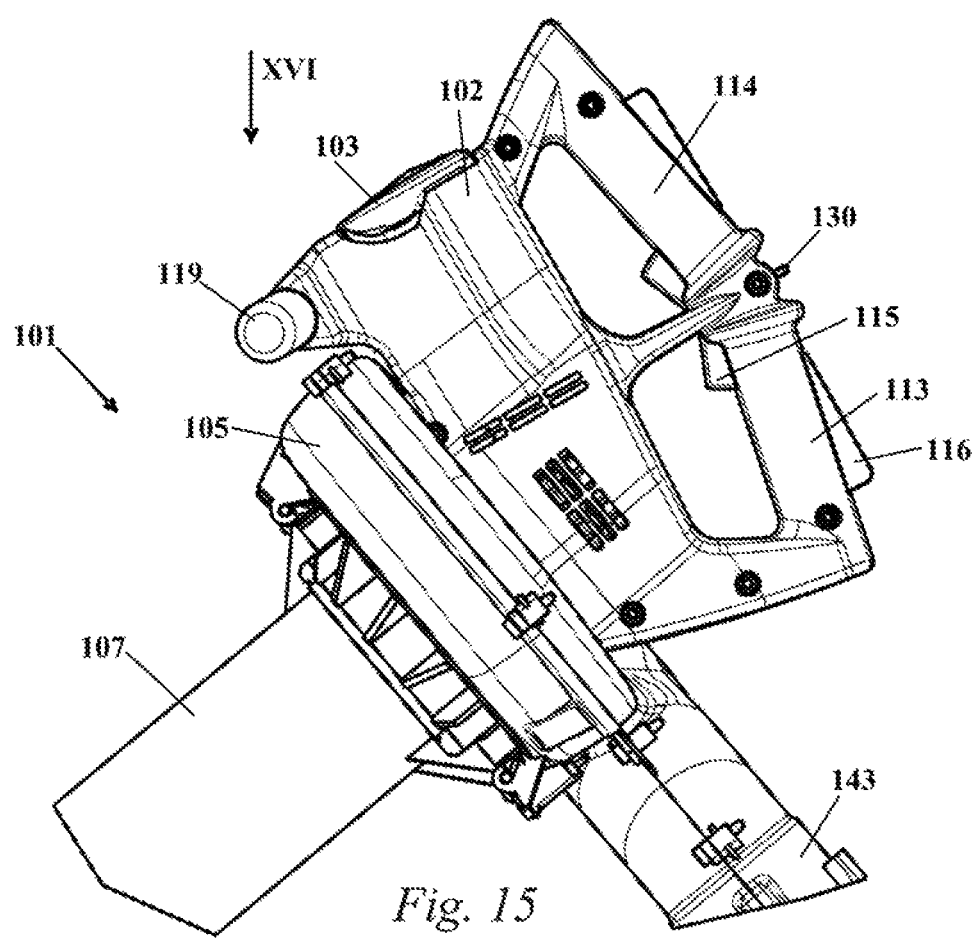
FIG. 15 shows an enlarged view of the vacuum apparatus according to FIG. 9, the supplemental handle being arranged in the opposite receptacle.
Figure 16:
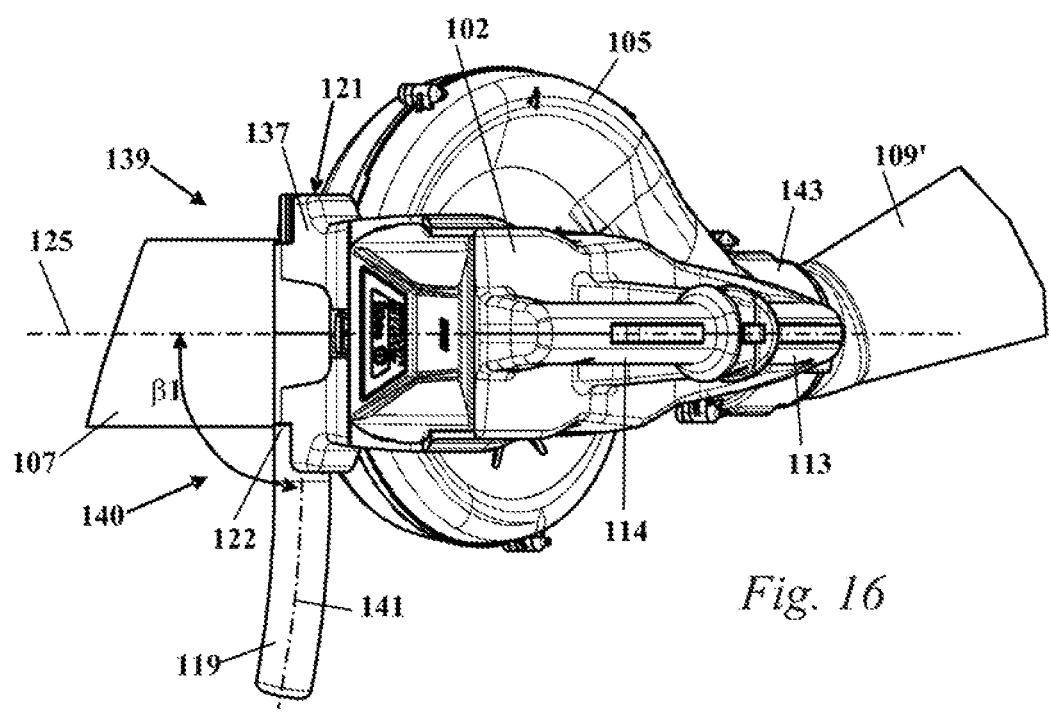
FIG. 16 shows a plan view of the vacuum apparatus in the configuration from FIG. 15 in the direction of the arrow XVI in FIG. 15.

FIGS. 15 and 16 show the vacuum/blower apparatus 101 in the configuration for a right-handed person. The supplemental handle 119 is, as FIGS. 15 and 16 show, arranged in the receptacle 122 on the left side 140 of the center plane 125. In this arrangement, too, the longitudinal center axis 141 of the supplemental handle 119 encloses an angle β1 with the center plane 125 that is advantageously at least 30°. The angle β1 is advantageously at least 30°, in particular at least 60°, preferably at least 80°, at least in the region adjoining the receptacle 122. In an advantageous configuration, the angle β1 is at least 30°, in particular at least 60°, preferably at least 70°, in every region of the center axis 141. As FIG. 16 also shows, a collection bag support 109' is arranged on the discharge support 143, the collection bag support 109' being directed from the discharge support 143 in the direction of the right side 139 of the center plane 125. As a result, in the configuration for a right-handed person, there is enough space on the left side 140 of the center plane 125 for an operator standing on this side.

Figure 17:
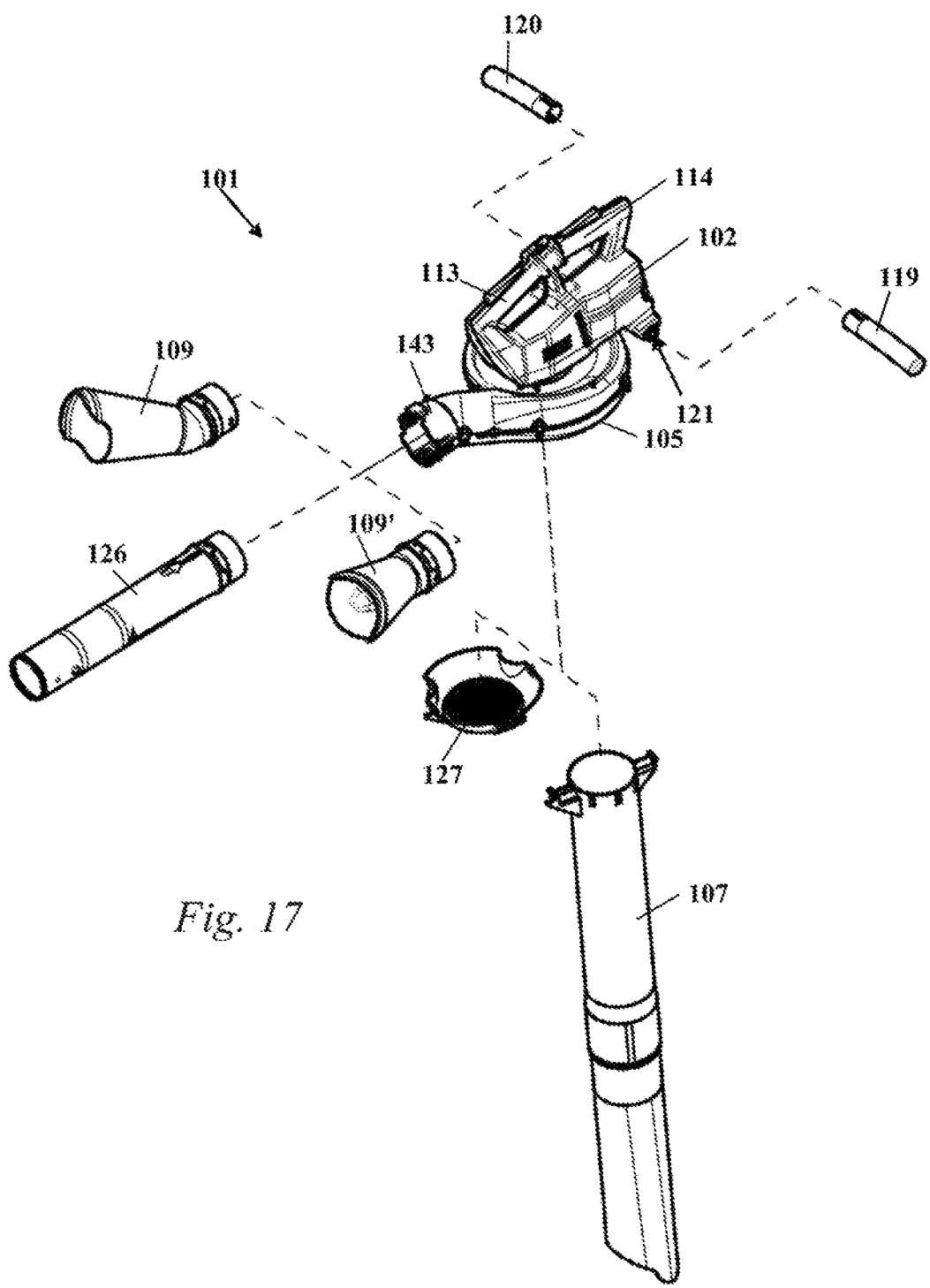
FIG. 17 shows a schematic exploded view of the vacuum apparatus from FIG. 9, all the fittings provided for the vacuum/blower apparatus being shown.

The vacuum/blower apparatus 101 can be provided with different fittings, which are schematically shown in FIG. 17. On the housing 102, a supplemental handle 119 or alternatively a supplemental handle 120 can be arranged. Preferably, a single supplemental handle 119 for arranging in either of the receptacles 121 and 122 (FIG. 16) is provided. On the discharge support 143, the collection bag support 109 or alternatively the collection bag support 109' can be arranged. The collection bag supports 109 and 109' are preferably formed in a mirror-symmetric manner to the center plane 125 (FIG. 16). In a second configuration 111 (FIG. 18) for blowing operation, a blower tube 126 can be arranged on the discharge support 143. At the intake opening 106 (FIG. 9), which is not shown in FIG. 17, the suction tube 107 for suction operation or alternatively, for blowing operation, an intake grille 127 can be arranged.

Figure 18:
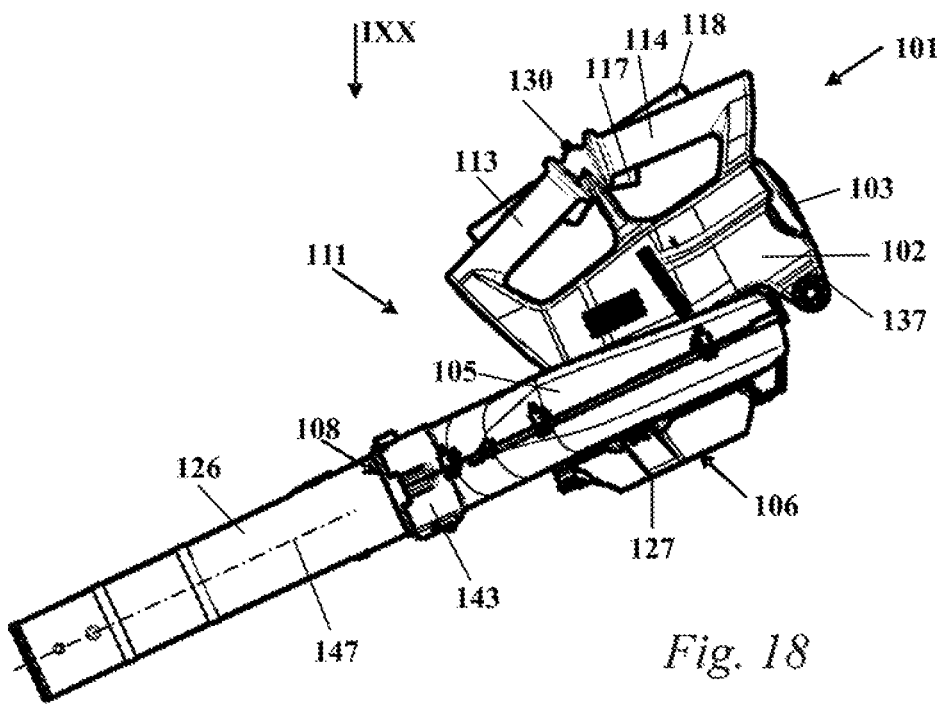
FIG. 18 shows a side view of the vacuum/blower apparatus from FIG. 9 in a configuration for blowing operation; and, FIG. 19 shows a plan view of the vacuum/blower apparatus in the configuration for blowing operation in the direction of the arrow IXX in FIG. 18.
Figure 19:
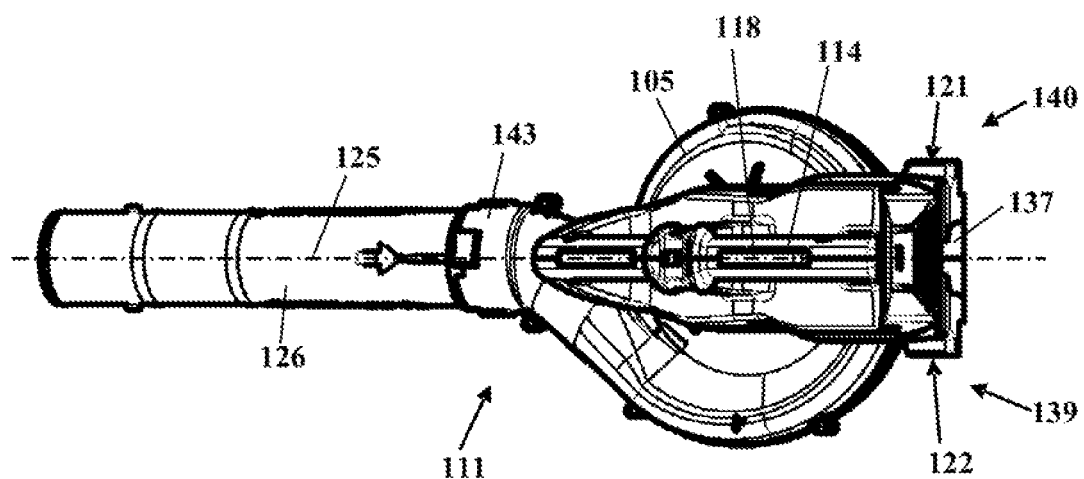

FIGS. 18 and 19 show the vacuum/blower apparatus 101 in a second configuration 111 for blowing operation. In this configuration, a blower tube 126 is arranged on the discharge support 143. Additionally, a suitable nozzle (not shown) can be fixed to the blower tube 126. The blower tube 126 has a longitudinal center axis 147 that coincides with the center plane 125 of the vacuum/blower apparatus 101 (FIG. 19). Arranged at the intake opening 106 is the intake grille 127. By way of the intake grille 127, working air is drawn in by the fan and blown out by the blower tube 126.

In the second configuration 111 for blowing operation, provision is made for the operator to guide the vacuum/blower apparatus 101 using the second handle 114 and to operate it via the second operator-controlled element 117. As is shown in particular in FIG. 19, no supplemental handles 119, 120 are provided for the second configuration 111 for blowing operation. No supplemental handle 119, 120 is arranged in either of the receptacles 121 and 122. As a result, an operator is not disrupted by any supplemental handle 119, 120 arranged in a receptacle 121, 122. Provision may also be made for a supplemental handle 119, 120 to remain in the associated receptacle 121, 122. If the operator is a right-handed person, he will stand on the left side 140 of the center plane 125 during suction operation, and the supplemental handle 119 will project on the left side 140 of the center plane. During blowing operation, by contrast, the operator is arranged on the right side 139 of the vacuum/blower apparatus 101. In a corresponding manner, a left-handed operator is arranged on the right side 139 of the center plane 125 in suction operation, and the supplemental handle 119 projects on the right side 139 of the center plane, while, in blowing operation, the operator stands on the left side 140 of the center plane 125, and so the supplemental handle 119 does not disrupt in each case during blowing operation.

It is understood that the foregoing description is that of the preferred embodiments of the invention and that various changes and modifications may be made thereto without departing from the spirit and scope of the invention as defined in the appended claims.

What is claimed is:
1. A blower apparatus comprising:
a fan;
a drive motor driving said fan;
an intake opening and a discharge opening;
a handle for guiding said blower apparatus;
said handle being mounted on said blower apparatus so as to permit pivoting said handle from a first position into at least a second position;
said handle defining a grip region;
said blower apparatus being configured to cause an air flow to pass said discharge opening in a discharge direction during operation of said blower apparatus;
said grip region being inclined relative to said discharge direction at a first inclination in said first position and at a second inclination in said second position different than said first inclination;
said grip region defines a longitudinal axis;
said longitudinal axis is orientated in a direction of a first direction vector in said first position;
said longitudinal axis is orientated in a direction of a second direction vector in said second position;
said air flow passes said discharge opening in a direction of a third direction vector arranged at said discharge opening;
a first angle ($\alpha$) is measured from said third direction vector to said first direction vector in the direction of said grip region;
a second angle ($\beta$) is measured from said third direction vector to said second direction vector in the direction of said grip region; and,
said first angle ($\alpha$) is greater than said second angle ($\beta$).

2. The blower apparatus of claim 1, wherein there is a difference ($\Delta$) between said first angle ($\alpha$) and said second angle ($\beta$) which is greater than 10°.

3. The blower apparatus of claim 1, wherein there is a difference ($\Delta$) between said first angle ($\alpha$) and said second angle ($\beta$) which is less than 200°.

4. The blower apparatus of claim 1, wherein said first angle ($\alpha$) lies in a range of $170° < \alpha < 220°$.

5. The blower apparatus of claim 1, wherein said grip region is at least partially inclined away from said discharge opening in said first position; and, said grip region is at least partially inclined in a direction toward said discharge opening in said second position.

6. The blower apparatus of claim 1, wherein said handle is pivotable about a pivot axis.

7. The blower apparatus of claim 6, wherein said handle, in said second position, is pivoted by 180° about said pivot axis compared to said first position.

8. The blower apparatus of claim 1, wherein said blower apparatus is selectively operable in a suction mode or in a blower mode; and, said first position of said handle corresponds to said suction mode and said second position of said handle corresponds to said blower mode.

9. The blower apparatus of claim 1, wherein said handle defines a longitudinal direction and said handle has first and second ends in said longitudinal direction; and, wherein said blower apparatus further comprises:
an operator-controlled element for controlling said drive motor;
said operator-controlled element being arranged in the region of said first end;
said first end being directed away from said discharge opening in said first position of said handle; and,
said first end being directed toward said discharge opening in said second position of said handle.

10. The blower apparatus of claim 9, wherein said operator-controlled element is arranged at a fixed position on said handle.

11. The blower apparatus of claim 1, further comprising a second handle; and, said discharge opening and said second handle lying on mutually opposite sides of said fan.

12. The blower apparatus of claim 1, wherein said fan is a radial fan.

13. The blower apparatus of claim 12, wherein:
said handle is pivotable about a pivot axis, wherein said pivot axis is orientated in a direction of a fourth direction vector;
said fourth direction vector points at least partially in a direction from said discharge opening to said handle;
said air flow passes said intake opening in a direction of a fifth direction vector arranged at said intake opening;
a fourth angle (δ) is measured from said fifth direction vector to said fourth direction vector in a direction away from said discharge opening; and,
said fourth angle (δ) is greater than 10°.

14. The blower apparatus of claim 13, wherein a fifth angle (ε) is measured from said fifth direction vector to said first direction vector in a direction away from said discharge opening; and, said fifth angle (ε) lies in a range of 80°<ε<130°.

15. A blower apparatus comprising:
a fan;
a drive motor driving said fan;
an intake opening and a discharge opening;
a handle for guiding said blower apparatus;
said handle being mounted on said blower apparatus so as to permit pivoting said handle from a first position into at least a second position;
said handle defining a grip region;
said blower apparatus being configured to cause an air flow to pass said discharge opening in a discharge direction during operation of said blower apparatus;
said grip region being inclined relative to said discharge direction at a first inclination in said first position and at a second inclination in said second position different than said first inclination;
wherein said handle is pivotable about a pivot axis;
said air flow passes said discharge opening in a direction of a third direction vector arranged at said discharge opening; wherein said pivot axis is orientated in a direction of a fourth direction vector;
said fourth direction vector points at least partially in a direction from said discharge opening to said handle; a third angle (γ) between said third direction vector and said fourth direction vector lies in a range of 90°<γ<180°;
and,
said third angle (γ) is measured from said third direction vector in the direction of said grip region.

* * * * *

UNITED STATES PATENT AND TRADEMARK OFFICE
CERTIFICATE OF CORRECTION

PATENT NO. : 11,445,870 B2
APPLICATION NO. : 16/436594
DATED : September 20, 2022
INVENTOR(S) : Kuschewski et al.

It is certified that error appears in the above-identified patent and that said Letters Patent is hereby corrected as shown below:

In the Specification

In Column 10:
Line 39: delete "r" and insert -- $\eta$ -- therefor.

Signed and Sealed this
Fifteenth Day of November, 2022

Katherine Kelly Vidal
*Director of the United States Patent and Trademark Office*